United States Patent
Wu et al.

(10) Patent No.: US 12,496,572 B2
(45) Date of Patent: Dec. 16, 2025

(54) HYDROGENATION CATALYST, AND PREPARATION METHOD THEREFOR AND USE THEREOF

(71) Applicants: HUANENG CLEAN ENERGY RESEARCH INSTITUTE, Beijing (CN); SHANGHAI SHIDONGKOU NO. 2 POWER PLANT HUANENG INTERNATIONAL POWER CO. LTD, Shanghai (CN)

(72) Inventors: Tong Wu, Beijing (CN); Qi Wang, Beijing (CN); Xu Li, Beijing (CN); Lianbo Liu, Beijing (CN); Shiwang Gao, Beijing (CN); Dongfang Guo, Beijing (CN); Zhong He, Beijing (CN); Achao Cheng, Beijing (CN)

(73) Assignees: HUANENG CLEAN ENERGY RESEARCH INSTITUTE, Beijing (CN); SHANGHAI SHIDONGKOU NO. 2 POWER PLANT HUANENG INTERNATIONAL POWER CO. LTD, Shanghai (CN)

( * ) Notice: Subject to any disclaimer, the term of this patent is extended or adjusted under 35 U.S.C. 154(b) by 42 days.

(21) Appl. No.: 18/714,192

(22) PCT Filed: Jun. 29, 2022

(86) PCT No.: PCT/CN2022/098593
§ 371 (c)(1),
(2) Date: May 29, 2024

(87) PCT Pub. No.: WO2023/093000
PCT Pub. Date: Jun. 1, 2023

(65) Prior Publication Data
US 2024/0390879 A1 Nov. 28, 2024

(30) Foreign Application Priority Data
Nov. 29, 2021 (CN) .......................... 202111432410.X (51) Int. Cl.
*B01J 23/83* (2006.01)
*B01J 35/57* (2024.01)
(Continued)

(52) U.S. Cl.
CPC ............... *B01J 23/83* (2013.01); *B01J 35/57* (2024.01); *B01J 35/60* (2024.01); *B01J 37/0201* (2013.01);
(Continued)

(58) Field of Classification Search
CPC ... B01J 23/83; B01J 35/60; B01J 35/57; B01J 37/0201; B01J 37/04; B01J 37/08;
(Continued)

(56) References Cited

U.S. PATENT DOCUMENTS 4,253,992 A * 3/1981 Soejima ................... B01J 35/60
501/109
4,833,115 A 5/1989 Koschlig et al.
(Continued)

FOREIGN PATENT DOCUMENTS

CN 1508233 A 6/2004
CN 101429050 A 5/2009
(Continued)

OTHER PUBLICATIONS

Xiamming Cheng et al., "Thermal deactivation mechanism of the commercial Pt/Pd/Rh/CeO2-ZrO2/Al2O3 catalysts aged under different conditions for the aftertreatment of CNG-fueled vehicle exhaust." Fuel 344, pp. 1-14. (Year: 2023).*
(Continued)

*Primary Examiner* — Patricia L. Hailey
(74) *Attorney, Agent, or Firm* — Maginot, Moore & Beck, LLP (57) ABSTRACT

A hydrogenation catalyst provided in the present application includes a carrier, an active component and an auxiliary agent, in which the carrier has a directional honeycomb pore structure, an average pore size of the honeycomb pore is 5 to 20 μm; and the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 30 to 100 nm.

13 Claims, 2 Drawing Sheets

(51) Int. Cl.
*B01J 35/60* (2024.01)
*B01J 37/02* (2006.01)
*B01J 37/04* (2006.01)
*B01J 37/08* (2006.01)
*B01J 37/32* (2006.01)
*B01J 37/34* (2006.01)
*C07C 1/12* (2006.01)

(52) U.S. Cl.
CPC ............... *B01J 37/04* (2013.01); *B01J 37/08* (2013.01); *B01J 37/32* (2013.01); *B01J 37/343* (2013.01); *C07C 1/12* (2013.01); *C07C 2523/83* (2013.01)

(58) Field of Classification Search
CPC .......... B01J 37/32; B01J 37/343; C07C 1/12; C07C 2523/83
USPC ....... 502/328, 331, 324, 333, 334, 339, 349, 502/350, 355, 527.19; 423/608, 625, 423/628; 428/117, 593; 264/630
See application file for complete search history.

(56) References Cited

U.S. PATENT DOCUMENTS

| | | | | |
|---|---|---|---|---|
| 6,072,097 | A * | 6/2000 | Yokoyama | B01J 23/8926 585/656 |
| 7,718,569 | B2 * | 5/2010 | Ng | C07C 5/03 585/277 |
| 7,754,160 | B2 * | 7/2010 | Miyairi | B01J 37/343 422/180 |
| 2004/0048114 | A1 * | 3/2004 | Shore | C01B 3/586 429/444 |
| 2010/0222209 | A1 * | 9/2010 | Kashani-Shirazi | C04B 35/14 502/159 |
| 2010/0240934 | A1 * | 9/2010 | Henkelmann | B01J 23/002 568/861 |
| 2013/0089481 | A1 * | 4/2013 | Sumiya | B01J 29/068 60/299 |

FOREIGN PATENT DOCUMENTS

| | | | | |
|---|---|---|---|---|
| CN | 102626621 | A | 8/2012 | |
| CN | 103263922 | A | 8/2013 | |
| CN | 104148065 | A * | 11/2014 | ............. B01J 23/63 |
| CN | 105498756 | A | 4/2016 | |
| CN | 110787789 | A | 2/2020 | |
| CN | 116116404 | A * | 5/2023 | ............. B01J 23/44 |
| JP | 2005-087826 | A * | 4/2005 | ............. B01D 53/94 |
| WO | 2017161953 | A1 | 9/2017 | |

OTHER PUBLICATIONS

Cristian Ledesma et al., "CuZn/ZrO2 catalytic honeycombs for dimethyl ether steam reforming and autothermal reforming." Fuel 104, pp. 711-716. (Year: 2013).*
International Search Report corresponding to PCT Application No. PCT/CN2022/098593, mailed Aug. 22, 2022. (Chinese and English language document). (5 pages).
Chinese Office Action for corresponding Cn 202111432410.X, mailed Dec. 5, 2023. (English language document). (9 pages).
Chinese Office Action for corresponding Cn 202111432410.X, mailed Mar. 8, 2024. (English language document). (10 pages).
English Translation of First Office Action for CN202111432410.X, dated Dec. 5, 2023.
English Translation of Second Office Action for CN202111432410.X, dated Mar. 8, 2024.

* cited by examiner

HYDROGENATION CATALYST, AND PREPARATION METHOD THEREFOR AND USE THEREOF

CROSS-REFERENCE TO RELATED APPLICATIONS

This application is a National Stage Application under 35 USC § 371 of International Application PCT/CN2022/098593, filed Jun. 29, 2022, which is based upon and claims priority to Chinese Patent Application 202111432410.X, filed Nov. 29, 2021, and entitled "HYDROGENATION CATALYST, AND PREPARATION METHOD THEREFOR AND USE THEREOF", the entire contents of which are incorporated herein by reference.

TECHNICAL FIELD

The present disclosure relates to the field of preparing hydrogenation catalyst technology, and more particularly to a hydrogenation catalyst and a preparation method and use thereof.

BACKGROUND

With a rapid development of the economic society, $CO_2$ emissions caused by human activities, such as a fossil energy combustion, an industry, and a life, have been rising year by year, and a global environmental change caused by it has become a key concern of governments around the world. At the same time, $CO_2$, as an abundant and sustainable carbon resource, may be converted into energy or chemical products with an economic value. Therefore, realizing a resource utilization of $CO_2$ has an important strategic significance in terms of solving energy problems and alleviating the greenhouse effect. Methanol is not only an excellent fuel, but also a very important basic chemical raw material, and may be converted into a series of high-value-added chemical products such as olefins and aromatics. Its demand is increasing day by day around the world. Therefore, a technology for preparing methanol by catalytically hydrogenating the $CO_2$ using hydrogen produced by a renewable energy has attracted a widespread attention, and a research and development of catalysts is a key to realizing a hydrogenation of the $CO_2$ to synthesize the methanol.

A catalyst required for the technology for preparing the methanol by catalytically hydrogenating the $CO_2$ is required to have a certain shape and a suitable particle size, and in order to ensure that the catalyst has a higher structural stability in a reactor, a catalyst carrier must have a certain mechanical strength. A granulation manner is usually used to meet stringent requirements of a catalytic reaction process and mechanical strength for the catalyst. However, a granulated catalyst has structural defects such as a reduced specific surface area and irregular pores, which will lead to problems such as a reduced number of exposed catalytic active sites and a sintering of an active component at a high temperature during a catalytic process, thus affecting a catalytic activity, selectivity and stability. In recent years, there have also been reports on a preformed catalyst carrier, but the carriers all have an irregular porous structure, which will affect a dispersion effect and macroscopic distribution of the active component, thereby having a negative impact on a catalytic effect of the catalyst itself.

In summary, a development of a hydrogenation catalyst having a high methanol selectivity and a high carbon dioxide conversion efficiency has a very important application significance.

SUMMARY

Purposes of the present disclosure is to overcome defects of a limited methanol selectivity and carbon dioxide conversion rate of the catalyst for synthesizing the methanol by hydrogenating the carbon dioxide in the above related art, and further to provide a catalyst having a honeycomb carrier structure and a preparation method thereof.

The technical solutions adopted by the present disclosure to solve the above technical problems are as follows.

A hydrogenation catalyst, in some embodiments, includes a carrier, an active component and an auxiliary agent. The carrier has a directional honeycomb pore structure, a pore size of the honeycomb pore is 5 to 20 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 30 to 100 nm.

The present disclosure also provides a method for preparing the hydrogenation catalyst, which, in some embodiments, includes following steps:
1) mixing a carrier raw material with a solvent, followed by ultrasonication, then adding a binder, followed by ball milling to obtain a carrier slurry;
2) freezing and drying the carrier slurry to obtain a carrier blank;
3) calcining the carrier blank to obtain a catalyst carrier;
4) adding a precursor impregnation liquid of the active component and the auxiliary agent to a surface of the catalyst carrier, and then treating the catalyst carrier under a vacuum condition, followed by drying and roasting to obtain the hydrogenation catalyst.

The present disclosure also provides use of the hydrogenation catalyst as described above or the hydrogenation catalyst prepared by a preparation method as described above in a reaction of synthesizing methanol by hydrogenating carbon dioxide.

BRIEF DESCRIPTION OF THE DRAWINGS

In order to more clearly illustrate the technical solutions in specific implementation manners of the present disclosure or in the related art, the accompanying drawings to be used in the description of specific implementation manners or the related art will be briefly introduced below. Apparently, the drawings in the following description show some implementation manners of the present disclosure. For those ordinarily skilled in the art, other drawings may also be obtained according to these drawings without any creative effort.

DETAILED DESCRIPTION

The following examples are provided for a better further understanding of the present disclosure, but are not limited to the best implementation manners, and do not limit the content and protection scope of the present disclosure. Any product identical or similar to the present disclosure obtained by anyone under the inspiration of the present disclosure or by combining the features of the present disclosure with other related arts shall fall within the protection scope of the present disclosure.

Example 1

This example provides a method for preparing a hydrogenation catalyst, which includes following steps.

In step (1), zirconium oxide powders as a carrier raw material were added to ethanol, an amount of the zirconium oxide powders added was 20 wt % of a mass of the ethanol, ultrasonication was performed for 30 min at an ultrasonic power of 100 W, and then magnesium aluminosilicate binder was added, an amount of magnesium aluminosilicate binder added was 5 vol % of a volume of the ethanol, and an obtained mixed solution was transferred to a ball mill for ball milling at a ball milling temperature of room temperature and a ball milling time of 1 h to obtain a stable carrier slurry.

In step (2), the carrier slurry was injected into a mold, and then the mold was placed in a freeze dryer for freezing at a freezing temperature of −100° C. and a freezing time of 120 min, and after freeze molding, transferred to a vacuum drying oven and dried at a condition of 10° C. for 12 h to obtain a honeycomb carrier blank.

In step (3), the honeycomb carrier blank was transferred to a high-temperature furnace for roasting at 1500° C. for 2 h to obtain a honeycomb catalyst carrier.

In step (4), copper nitrate was dissolved in deionized water to prepare a solution with a concentration of 0.25 mol/L, then zinc nitrate was added to the solution (a molar ratio of the copper nitrate to the zinc nitrate was 2:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 10 Pa and a treatment time of 10 min, after completing the treatment under a vacuum condition, dried at 50° C. for 6 h, and then roasted at 600° C. for 2 h. The above step (4) was repeated multiple times until a loading amount of an active component and an auxiliary agent was reached 25.5 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 12 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 50 nm; the active component is metallic copper, the auxiliary agent is zinc oxide, and the carrier is zirconium oxide; based on a total weight of the catalyst, a content of the active component calculated as a metal element is 18 wt %, a content of the auxiliary agent calculated as a metal element is 9 wt %, and the rest is the carrier.

In step (5), a catalyst activity evaluation was performed in a fluidized bed reactor under following reaction conditions: a temperature of 320° C., a reaction pressure of 1 MPa, a space velocity of 3000 h$^{-1}$, and a molar ratio of n(H$_2$):n(CO$_2$)=2:1. Before a carbon dioxide hydrogenation reaction, the catalyst was first reduced by introducing a mixture of hydrogen and nitrogen in a volume ratio of 1:10 and performing a reduction treatment at 300° C. for 3 h.

Figure 1:
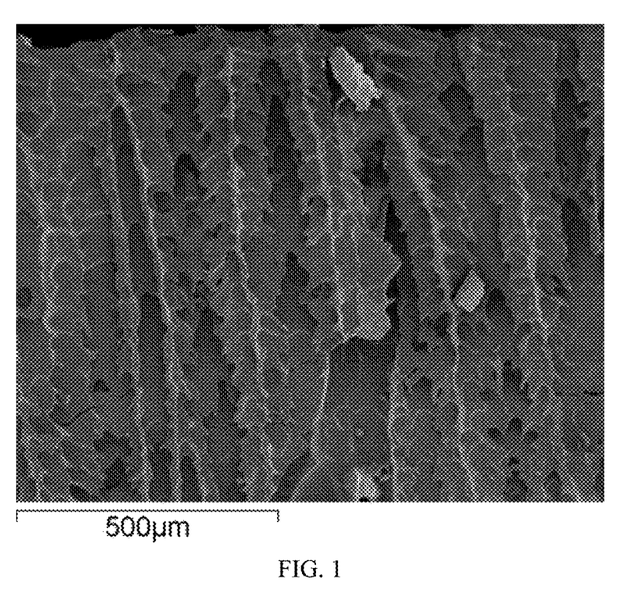
FIG. 1 is a scanning electron microscope (SEM) image of a longitudinal section of a catalyst obtained in Example 1 of the present disclosure.
Figure 2:
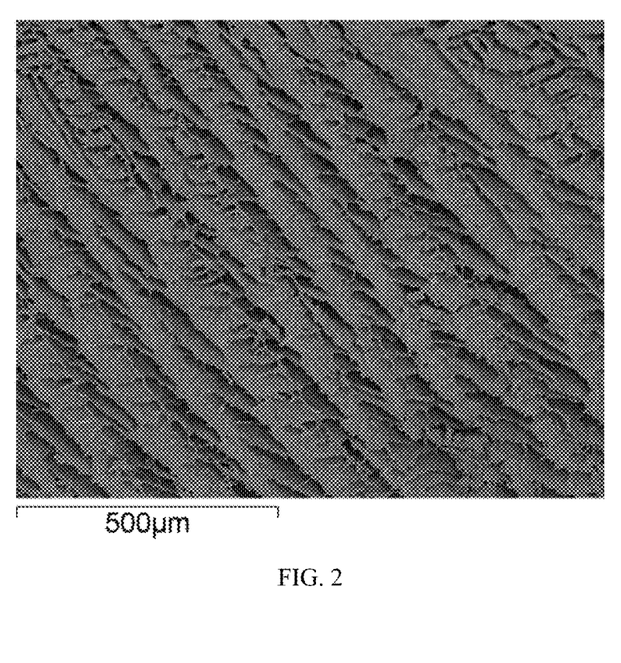
FIG. 2 is a scanning electron microscope (SEM) image of a cross section of a catalyst obtained in Example 1 of the present disclosure.
Figure 3:
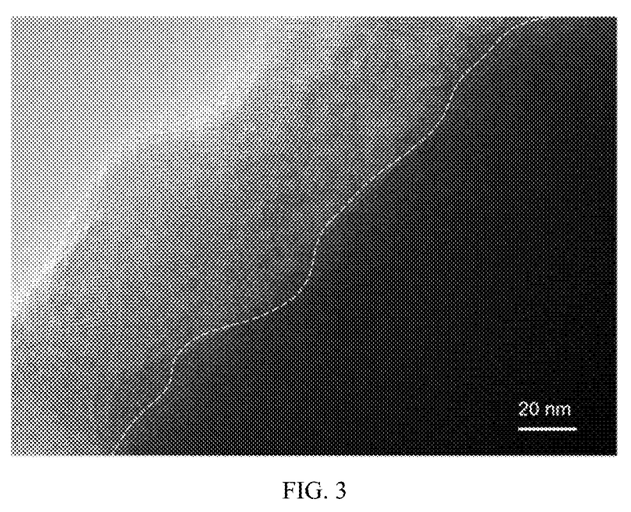
FIG. 3 is a transmission electron microscope (TEM) image of a catalyst having a honeycomb carrier structure obtained in Example 1 of the present disclosure.

It may be seen from FIG. 1 and FIG. 2 that an obtained catalyst carrier has a directional honeycomb pore structure. It may be seen from FIG. 3 that a thickness of the catalyst layer is 50 nm.

Example 2

This example provides a method for preparing a hydrogenation catalyst, which includes following steps.

In step (1), zirconium oxide powders as a carrier raw material were added to ethanol, an amount of the zirconium oxide powders added was 10 wt % of a mass of the ethanol, ultrasonication was performed for 30 min at an ultrasonic power of 100 W, and then magnesium aluminosilicate binder was added, an amount of magnesium aluminosilicate binder added was 5 vol % of a volume of the ethanol, and an obtained mixed solution was transferred to a ball mill for ball milling at a ball milling temperature of room temperature and a ball milling time of 2 h to obtain a stable carrier slurry.

In step (2), the carrier slurry was injected into a mold, and then the mold was placed in a freeze dryer for freezing at a freezing temperature of −100° C. and a freezing time of 180 min, and after freeze molding, transferred to a vacuum drying oven and dried at a condition of 8° C. for 12 h to obtain a honeycomb carrier blank.

In step (3), the honeycomb carrier blank was transferred to a high-temperature furnace for roasting at 1500° C. for 2 h to obtain a honeycomb catalyst carrier.

In step (4), copper nitrate was dissolved in deionized water to prepare a solution with a concentration of 0.25 mol/L, then zinc nitrate was added to the solution (a molar ratio of the copper nitrate to the zinc nitrate was 2:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 8 Pa and a treatment time of 10 min, after completing the treatment under a vacuum condition, dried at 50° C. for 6 h, and then roasted at 600° C. for 2 h. The above step (4) was repeated multiple times until a loading amount of an active component and an auxiliary agent was reached 25.5 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 11.5 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 53 nm; the active component is metallic copper, the auxiliary agent is zinc oxide, and the carrier is zirconium oxide; based on a total weight of the catalyst, a content of the active component calculated as a metal element is 18 wt %, a content of the auxiliary agent calculated as a metal element is 9 wt %, and the rest is the carrier.

In step (5), a catalyst activity evaluation was performed in a fluidized bed reactor, and reaction conditions were the same as in Example 1.

Example 3

This example provides a method for preparing a hydrogenation catalyst, which includes following steps.

In step (1), zirconium oxide powders as a carrier raw material were added to ethanol, an amount of the zirconium oxide powders added was 15 wt % of a mass of the ethanol, ultrasonication was performed for 30 min at an ultrasonic power of 100 W, and then magnesium aluminosilicate binder was added, an amount of magnesium aluminosilicate binder added was 10 vol % of a volume of the ethanol, and an obtained mixed solution was transferred to a ball mill for ball milling at a ball milling temperature of room temperature and a ball milling time of 2 h to obtain a stable carrier slurry.

In step (2), the carrier slurry was injected into a mold, and then the mold was placed in a freeze dryer for freezing at a freezing temperature of −150° C. and a freezing time of 180 min, and after freeze molding, transferred to a vacuum drying oven and dried at a condition of 8° C. for 12 h to obtain a honeycomb carrier blank.

In step (3), the honeycomb carrier blank was transferred to a high-temperature furnace for roasting at 1500° C. for 2 h to obtain a honeycomb catalyst carrier.

In step (4), copper nitrate was dissolved in deionized water to prepare a solution with a concentration of 0.25 mol/L, then zinc nitrate was added to the solution (a molar ratio of the copper nitrate to the zinc nitrate was 3:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 10 Pa and a treatment time of 12 min, after completing the treatment under a vacuum condition, dried at 50° C. for 6 h, and then roasted at 600° C. for 2 h. The above step (4) was repeated multiple times until a loading amount of an active component and an auxiliary agent was reached 28 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 10.3 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 54 nm; the active component is metallic copper, the auxiliary agent is zinc oxide, and the carrier is zirconium oxide; based on a total weight of the catalyst, a content of the active component calculated as a metal element is 22.3 wt %, a content of the auxiliary agent calculated as a metal element is 7.4 wt %, and the rest is the carrier.

In step (5), a catalyst activity evaluation was performed in a fluidized bed reactor, and reaction conditions were the same as in Example 1.

Example 4

This example provides a method for preparing a hydrogenation catalyst, which includes following steps.

In step (1), zirconium oxide powders as a carrier raw material were added to ethanol, an amount of the zirconium oxide powders added was 15 wt % of a mass of an ethanol solution, ultrasonication was performed for 30 min at an ultrasonic power of 100 W, and then magnesium aluminosilicate binder was added, an amount of magnesium aluminosilicate binder added was 5 vol % of a volume of the ethanol solution, and an obtained mixed solution was transferred to a ball mill for ball milling at a ball milling temperature of room temperature and a ball milling time of 2 h to obtain a stable carrier slurry.

In step (2), the carrier slurry was injected into a mold, and then the mold was placed in a freeze dryer for freezing at a freezing temperature of −150° C. and a freezing time of 180 min, and after freeze molding, transferred to a vacuum drying oven and dried at a condition of 10° C. for 12 h to obtain a honeycomb carrier blank.

In step (3), the honeycomb carrier blank was transferred to a high-temperature furnace for roasting at 1500° C. for 2 h to obtain a honeycomb catalyst carrier.

In step (4), copper nitrate was dissolved in deionized water to prepare a solution with a concentration of 0.25 mol/L, then zinc nitrate was added to the solution (a molar ratio of the copper nitrate to the zinc nitrate was 3:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 10 Pa and a treatment time of 10 min, after completing the treatment under a vacuum condition, dried at 50° C. for 6 h, and then roasted at 600° C. for 2 h. The above step (4) was repeated multiple times until a loading amount of an active component and an auxiliary agent was reached 35 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 10 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 65 nm; the active component is metallic copper, the auxiliary agent is zinc oxide, and the carrier is cerium oxide; based on a total weight of the catalyst, a content of the active component calculated as a metal element is 27.7 wt %, a content of the auxiliary agent calculated as a metal element is 9.2 wt %, and the rest is the carrier.

In step (5), a catalyst activity evaluation was performed in a fluidized bed reactor, and reaction conditions were the same as in Example 1.

Example 5

This example provides a method for preparing a hydrogenation catalyst, which includes following steps.

In step (1), zirconium oxide powders as a carrier raw material were added to ethanol, an amount of the zirconium oxide powders added was 15 wt % of a mass of an ethanol solution, ultrasonication was performed for 30 min at an ultrasonic power of 100 W, and then magnesium aluminosilicate binder was added, an amount of magnesium aluminosilicate binder added was 5 vol % of a volume of the ethanol solution, and an obtained mixed solution was transferred to a ball mill for ball milling at a ball milling temperature of room temperature and a ball milling time of 2 h to obtain a stable carrier slurry.

In step (2), the carrier slurry was injected into a mold, and then the mold was placed in a freeze dryer for freezing at a freezing temperature of −170° C. and a freezing time of 180 min, and after freeze molding, transferred to a vacuum drying oven and dried at a condition of 10° C. for 12 h to obtain a honeycomb carrier blank.

In step (3), the honeycomb carrier blank was transferred to a high-temperature furnace for roasting at 1500° C. for 2 h to obtain a honeycomb catalyst carrier.

In step (4), copper nitrate was dissolved in deionized water to prepare a solution with a concentration of 0.25 mol/L, then zinc nitrate was added to the solution (a molar ratio of the copper nitrate to the zinc nitrate was 3:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 10 Pa and a treatment time of 10 min, after completing the treatment under a vacuum condition, dried at 50° C. for 6 h, and then roasted at 600° C. for 2 h. The above step (4) was repeated multiple times until a loading amount of an active component and an auxiliary agent was reached 28 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 8 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 52 nm; the active component is metallic copper, the auxiliary agent is zinc oxide, and the carrier is cerium oxide; based on a total weight of the catalyst, a content of the active component calculated as a metal element is 22.2 wt %, a content of the auxiliary agent calculated as a metal element is 7.4 wt %, and the rest is the carrier.

In step (5), a catalyst activity evaluation was performed in a fluidized bed reactor, and reaction conditions were the same as in Example 1.

Example 6

In step (1), aluminum oxide and zirconium oxide (a molar ratio of the aluminum oxide to the zirconium oxide was 1:1) powders as a carrier raw material were added to ethanol, an amount of the powders added was 15 wt % of a mass of an ethanol solution, ultrasonication was performed for 30 min, and then magnesium aluminosilicate binder was added, an amount of magnesium aluminosilicate binder added was 10 vol % of a volume of the ethanol solution, and an obtained mixed solution was transferred to a ball mill for ball milling at a ball milling temperature of room temperature and a ball milling time of 2 h to obtain a stable carrier slurry.

In step (2), the carrier slurry was injected into a mold, and then the mold was placed in a freeze dryer for freezing at a freezing temperature of −150° C. and a freezing time of 180 min, and after freeze molding, transferred to a vacuum drying oven and dried at a condition of 8° C. for 12 h to obtain a honeycomb carrier blank.

In step (3), the honeycomb carrier blank was transferred to a high-temperature furnace for roasting at 1300° C. for 2 h to obtain a honeycomb catalyst carrier.

In step (4), palladium nitrate was dissolved in deionized water to prepare a solution with a concentration of 0.25 mol/L, then zinc nitrate was added to the solution (a molar ratio of the palladium nitrate to the zinc nitrate was 3:1) to prepare a precursor solution, then urea in an amount of 5 wt % of a mass of the precursor solution was added under stirring thoroughly, 30 μL of the above solution was took and dropped onto a surface of the carrier, then the carrier was transferred to the vacuum drying oven for a treatment at a treatment pressure of 10 Pa and a treatment time of 10 min, after completing the treatment under a vacuum condition, dried at 50° C. for 6 h, and then roasted at 700° C. for 2 h. The above step (4) was repeated multiple times until a loading amount of an active component and an auxiliary agent was reached 28 wt % of a total mass of the catalyst to obtain a hydrogenation catalyst.

The hydrogenation catalyst prepared above is composed of a carrier, an active component and an auxiliary agent; the carrier has a directional honeycomb pore structure, an average pore size of the honeycomb pore is 10.2 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 56 nm; the active component is metallic palladium, the auxiliary agent is gadolinium oxide, and the carrier is the zirconium oxide and cerium oxide; based on a total weight of the catalyst, a content of the active component calculated as a metal element is 22.3 wt %, a content of the auxiliary agent calculated as a metal element is 7.4 wt %, and the rest is the carrier.

In step (5), a catalyst activity evaluation was performed in a fluidized bed reactor, and reaction conditions were the same as in Example 1.

Comparative Example 1

Figure 4:
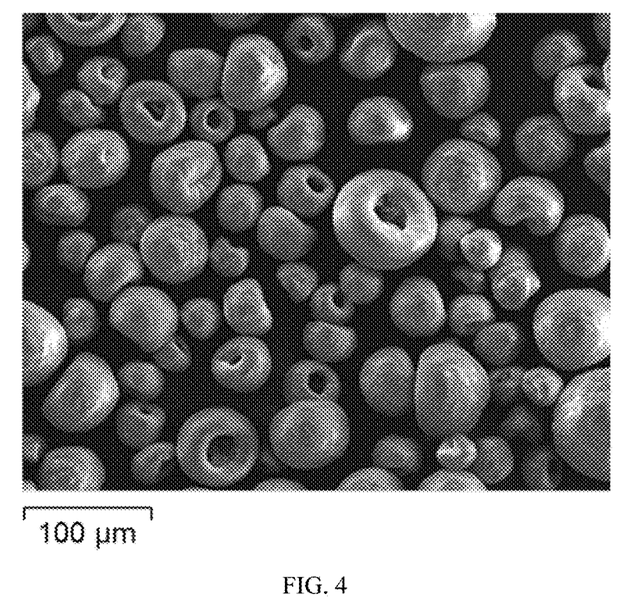
FIG. 4 is a scanning electron microscope (SEM) image of a catalyst of Comparative Example 1.

This comparative example provides a hydrogenation catalyst and an activity evaluation method thereof, and a difference compared to Example 1 is only that the carrier slurry was not subjected to a freeze molding treatment in the step (2). FIG. 4 is a scanning electron microscope (SEM) image of the catalyst of Comparative Example 1.

Test Example 1

The results of the catalyst activity evaluation of the above examples and comparative example are shown in Table 1.

TABLE 1

| Catalyst | $CO_2$ Conversion Rate % | Selectivity % | | Yield % |
| | | $CH_3OH$ | CO | $CH_3OH$ |
| --- | --- | --- | --- | --- |
| Example 1 | 8.19 | 71.36 | 28.64 | 5.84 |
| Example 2 | 9.25 | 73.18 | 26.82 | 6.77 |
| Example 3 | 9.96 | 81.63 | 18.37 | 8.13 |

TABLE 1-continued

| Catalyst | CO$_2$ Conversion Rate % | Selectivity % | | Yield % |
| --- | --- | --- | --- | --- |
| | | CH$_3$OH | CO | CH$_3$OH |
| Example 4 | 11.82 | 82.91 | 17.09 | 9.80 |
| Example 5 | 9.47 | 79.47 | 20.53 | 7.53 |
| Example 6 | 10.31 | 80.40 | 18.72 | 8.29 |
| Comparative Example 1 | 6.15 | 68.81 | 23.28 | 4.23 |

Reaction conditions: temperature of 320° C., pressure of 1 MPa, space velocity of 3000 h$^{-1}$, molar ratio of n(H$_2$):n(CO$_2$) = 2:1

The present disclosure provides a hydrogenation catalyst, in some embodiments, includes a carrier, an active component and an auxiliary agent. The carrier has a directional honeycomb pore structure, a pore size of the honeycomb pore is 5 to 20 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 30 to 100 nm.

In some embodiments, the active component is selected from one or more of copper, palladium, and platinum, the auxiliary agent is selected from one or more of zinc oxide, titanium oxide, manganese oxide, and gadolinium oxide, and the carrier is selected from one or more of zirconium oxide, aluminum oxide, cerium oxide, and titanium oxide.

In some embodiments, based on a total weight of the catalyst, a content of the active component calculated as a metal element is 5 to 30 wt %, a content of the auxiliary agent calculated as a metal element is 1 to 15 wt %, and the rest is the carrier.

The present disclosure also provides a method for preparing the hydrogenation catalyst, which, in some embodiments, includes following steps:
1) mixing a carrier raw material with a solvent, followed by ultrasonication, then adding a binder, followed by ball milling to obtain a carrier slurry;
2) freezing and drying the carrier slurry to obtain a carrier blank;
3) calcining the carrier blank to obtain a catalyst carrier;
4) adding a precursor impregnation liquid of the active component and the auxiliary agent to a surface of the catalyst carrier, and then treating the catalyst carrier under a vacuum condition, followed by drying and roasting to obtain the hydrogenation catalyst.

In some embodiments, a treatment pressure is 8 to 12 Pa and a treatment time is 5 to 15 min under the vacuum condition in step 4).

In some embodiments, a freezing temperature is −70 to −170° C., a freezing time is 60 to 300 min, the drying is vacuum drying, a drying temperature is 5 to 15° C., and a drying time is 12 to 24 h in step 2).

In some embodiments, in step 1), the carrier raw material is selected from one or more of zirconium oxide, aluminum oxide, cerium oxide, and titanium oxide;
the solvent is ethanol, the ultrasonication is performed at an ultrasonic power of 80 to 120 W and an ultrasonic time of 10 to 30 min;
a ball milling temperature is room temperature, and a ball milling time is 1 to 2 h;
the binder is a magnesium aluminosilicate binder;
the carrier raw material accounts for 5 to 60 wt % of a mass of the solvent;
the binder accounts for 2 to 8 vol % of a volume of the solvent.

A calcination temperature is 1000 to 1700° C. and a calcination time is 1 to 5 h in step 3).

A drying temperature is 20 to 100° C., and a drying time is 2 to 12 h; a roasting temperature is 200 to 1200° C., and a roasting time is 2 to 5 h in step 4).

In step 4), a manner of adding the precursor impregnation liquid of the active component and the auxiliary agent to a surface of the catalyst carrier may adopt a manner of dropwise addition, which may be performed multiple times until predetermined loading amounts of the active component and the auxiliary agent are reached. In some embodiments, an amount of the precursor impregnation liquid used each time may be 0.1 to 5 wt % of a mass of the catalyst carrier.

In some embodiments, a process for preparing the precursor impregnation liquid of the active component and the auxiliary agent in step 4) includes following steps: mixing a metal salt of the active component and a metal salt of the auxiliary agent with water to prepare a precursor solution, and then adding a dispersant to the precursor solution under stirring to obtain the precursor impregnation liquid of the active component and the auxiliary agent.

In some embodiments, the metal salt of the active component is selected from one or more of copper nitrate, palladium nitrate and platinum nitrate. The metal salt of the auxiliary agent is selected from one or more of zinc nitrate, titanium nitrate, manganese nitrate and gadolinium nitrate. A molar ratio of the metal salt of the active component to the metal salt of the auxiliary agent is (2 to 5):(1 to 2). The dispersant is a urea, the dispersant is added in an amount of 1 to 10 wt % based on a mass of the precursor solution. A concentration of the metal salt of the active component in the precursor solution is 0.1 to 2 mol/L.

The present disclosure also provides use of the hydrogenation catalyst as described above or the hydrogenation catalyst prepared by a preparation method as described above in a reaction of synthesizing methanol by hydrogenating carbon dioxide.

In some embodiments, conditions for synthesizing the methanol by hydrogenating the carbon dioxide are: 200 to 350° C., a reaction pressure of 1 to 5 MPa, a space velocity of 1000 to 9000 h$^{-1}$, and a molar ratio of n(H$_2$):n(CO$_2$)=1 to 5.

Before a carbon dioxide hydrogenation reaction, the catalyst is first reduced by introducing a mixture of hydrogen and nitrogen in a volume ratio of (1 to 5):10 and performing a reduction treatment at 300 to 600° C. for 1 to 6 h.

The technical solutions of the present disclosure have following advantages.

In the hydrogenation catalyst provided by the present disclosure, the carrier has the directional honeycomb pore structure, the average pore size of the honeycomb pore is 5 to 20 μm, the active component and the auxiliary agent are loaded on the outer surface of the carrier and the inner wall of the honeycomb pore, and the catalytic layer is formed on the outer surface of the carrier and the inner wall of the honeycomb pores, and the thickness of the catalytic layer is 30 to 100 nm. The present disclosure forms a nanoscale catalytic layer on an outer surface of the carrier and an inner wall surface of the pore of a micron-scale directional honeycomb pore structure, and an obtained hydrogenation catalyst has a high specific surface area, a high porosity and a highly ordered pore structure, and also has a higher strength, a high number of effective loading sites for the active component, and effectively improves a conversion rate of the carbon dioxide as well as a selectivity and yield of the methanol.

In the hydrogenation catalyst provided by the present disclosure, the active component is selected from one or more of copper, palladium, and platinum, the auxiliary agent is selected from one or more of zinc oxide, titanium oxide, manganese oxide, and gadolinium oxide, and the carrier is selected from one or more of zirconium oxide, aluminum oxide, cerium oxide, and titanium oxide. The present disclosure may further ensure the conversion rate of the carbon dioxide and the selectivity of the methanol by controlling the above specific active component, auxiliary agent and carrier component.

The method for preparing the hydrogenation catalyst provided by the present disclosure may obtain a high-strength micron-scale honeycomb carrier by freezing, drying and calcining the carrier slurry, provides a high specific surface area for an effective loading of the active component, and avoids a granulation process by a one-step molding. The precursor impregnation liquid is added to the surface of the catalyst carrier by an impregnation method, and then the catalyst carrier is placed under the vacuum condition for a treatment, so that the impregnation liquid is evenly deposited on the inner surface of the pore of the honeycomb carrier, and then dried and roasted to prepare an evenly dispersed nano-scale catalytic layer, thereby avoiding a high-temperature sintering of the catalyst. By precisely controlling a microstructure of the honeycomb carrier and a loading of the active component, it is possible to maintain a high selectivity and stability at a temperature of 200 to 350° C. and 1 to 5 MPa, thereby improving an activity, selectivity and stability of the catalyst, and it is expected to be applied industrially in the future.

Obviously, the above embodiments are merely examples for clear description and are not limitations of implementation manners. For ordinary skilled in the field, other different forms of changes or modifications may be made based on the above description. It is not necessary and impossible to list all implementation manners exhaustively here. The obvious changes or modifications derived therefrom are still within the protection scope of the present disclosure.

What is claimed is:

1. A hydrogenation catalyst, comprising a carrier, an active component and an auxiliary agent; wherein the carrier has a directional honeycomb pore structure, an average pore size of the honeycomb pore is 5 to 20 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 30 to 100 nm;
   wherein the hydrogenation catalyst is prepared by a method comprising following steps:
   1) mixing a carrier raw material with a solvent, followed by ultrasonication, then adding a binder, followed by ball milling to obtain a carrier slurry;
   2) freezing and drying the carrier slurry to obtain a carrier blank;
   3) calcining the carrier blank to obtain a catalyst carrier;
   4) adding a precursor impregnation liquid of the active component and the auxiliary agent to a surface of the catalyst carrier, and then treating the catalyst carrier under a vacuum condition, followed by drying and roasting to obtain the hydrogenation catalyst;
   wherein a calcination temperature is 1500 to 1700° C. and a calcination time is 1 to 5 h in step 3);
   the carrier is zirconium oxide, or zirconium oxide and aluminum oxide;
   the solvent is ethanol in step 1);
   the carrier raw material accounts for 10 to 20 wt % of a weight of the solvent;
   a freezing temperature is −70 to −170° C. in step 2);
   the precursor impregnation liquid of the active component and the auxiliary agent in step 4) is prepared by a process comprising following steps: mixing a metal salt of the active component and a metal salt of the auxiliary agent with water to prepare a precursor solution, and then adding a dispersant to the precursor solution under stirring to obtain the precursor impregnation liquid of the active component and the auxiliary agent;
   the dispersant is a urea.

2. The hydrogenation catalyst according to claim 1, wherein the active component is selected from one or more of copper, palladium, and platinum, the auxiliary agent is selected from one or more of zinc oxide, titanium oxide, manganese oxide, and gadolinium oxide.

3. The hydrogenation catalyst according to claim 1, wherein, based on a total weight of the catalyst, a content of the active component calculated as a metal element is 5 to 30 wt %, a content of the auxiliary agent calculated as a metal element is 1 to 15 wt %, and the rest is the carrier.

4. A method for preparing a hydrogenation catalyst, the hydrogenation catalyst comprising a carrier, an active component and an auxiliary agent; wherein the carrier has a directional honeycomb pore structure, an average pore size of the honeycomb pore is 5 to 20 μm, the active component and the auxiliary agent are loaded on an outer surface of the carrier and an inner wall of the honeycomb pore, and a catalytic layer is formed on the outer surface of the carrier and the inner wall of the honeycomb pore, and a thickness of the catalytic layer is 30 to 100 nm,
   the method comprising following steps:
   1) mixing a carrier raw material with a solvent, followed by ultrasonication, then adding a binder, followed by ball milling to obtain a carrier slurry;
   2) freezing and drying the carrier slurry to obtain a carrier blank;
   3) calcining the carrier blank to obtain a catalyst carrier;
   4) adding a precursor impregnation liquid of the active component and the auxiliary agent to a surface of the catalyst carrier, and then treating the catalyst carrier under a vacuum condition, followed by drying and roasting to obtain the hydrogenation catalyst;
   wherein a calcination temperature is 1500 to 1700° C. and a calcination time is 1 to 5 h in step 3);
   the carrier is zirconium oxide, or zirconium oxide and aluminum oxide;
   the solvent is ethanol in step 1);
   the carrier raw material accounts for 10 to 20 wt % of a weight of the solvent;
   a freezing temperature is −70 to −170° C. in step 2);
   a process for preparing the precursor impregnation liquid of the active component and the auxiliary agent in step 4) comprises following steps: mixing a metal salt of the active component and a metal salt of the auxiliary agent with water to prepare a precursor solution, and then adding a dispersant to the precursor solution under stirring to obtain the precursor impregnation liquid of the active component and the auxiliary agent;
   the dispersant is a urea.

5. The method for preparing the hydrogenation catalyst according to claim 4, wherein a treatment pressure is 8 to 12 Pa and a treatment time is 5 to 15 min under the vacuum condition in step 4).

6. The method for preparing the hydrogenation catalyst according to claim 4, wherein a freezing time is 60 to 300 min, the drying is vacuum drying, a drying temperature is 5 to 15° C., and a drying time is 12 to 24 h in step 2).

7. The method for preparing the hydrogenation catalyst according to claim 4, wherein
in step 1),
the ultrasonication is performed at an ultrasonic power of 80 to 120 W and an ultrasonic time of 10 to 30 min;
a ball milling temperature is room temperature, and a ball milling time is 1 to 2 h;
the binder is a magnesium aluminosilicate binder;
the binder accounts for 2 to 8 vol % of a volume of the solvent;
a drying temperature is 20 to 100° C., and a drying time is 2 to 12 h; a roasting temperature is 200 to 1200° C., and a roasting time is 2 to 5 h in step 4).

8. The method for preparing the hydrogenation catalyst according to claim 7, wherein
the metal salt of the active component is selected from one or more of copper nitrate, palladium nitrate and platinum nitrate;
the metal salt of the auxiliary agent is selected from one or more of zinc nitrate, titanium nitrate, manganese nitrate and gadolinium nitrate;
a molar ratio of the metal salt of the active component to the metal salt of the auxiliary agent is (2 to 5):(1 to 2);
and the dispersant is added in an amount of 1 to 10 wt % based on a mass of the precursor solution.

9. The method for preparing the hydrogenation catalyst according to claim 4, wherein the active component is selected from one or more of copper, palladium, and platinum, the auxiliary agent is selected from one or more of zinc oxide, titanium oxide, manganese oxide.

10. The method for preparing the hydrogenation catalyst according to claim 4, wherein, based on a total weight of the catalyst, a content of the active component calculated as a metal element is 5 to 30 wt %, a content of the auxiliary agent calculated as a metal element is 1 to 15 wt %, and the rest is the carrier.

11. The method for preparing the hydrogenation catalyst according to claim 4, wherein, in step 4), a manner of adding the precursor impregnation liquid of the active component and the auxiliary agent to a surface of the catalyst carrier is dropwise addition, which is performed multiple times until predetermined loading amounts of the active component and the auxiliary agent are reached.

12. The method for preparing the hydrogenation catalyst according to claim 4, wherein an amount of the precursor impregnation liquid used each time is 0.1 to 5 wt % of a mass of the catalyst carrier.

13. The method for preparing the hydrogenation catalyst according to claim 8, wherein a concentration of the metal salt of the active component in the precursor solution is 0.1 to 2 mol/L.

* * * * *